(12) United States Patent
Koh et al.

(10) Patent No.: US 6,285,460 B1
(45) Date of Patent: Sep. 4, 2001

(54) IMAGE PROCESSING APPARATUS HAVING A MODE FOR LAYING OUT A PREDETERMINED NUMBER OF PAGES OF A DOCUMENT ON A SINGLE SHEET FOR RECORDING

(75) Inventors: Shokyo Koh; Tokuharu Kaneko, both of Mishima; Keizo Isemura, Koganei; Hirohiko Tashiro, Yokohama; Akinobu Nishikata, Mishima; Masanobu Inui, Chigasaki; Nobuo Sekiguchi, Shizuoka-ken; Nobuaki Miyahara, Tokyo; Rieko Akiba, Shizuoka-ken, all of (JP)

(73) Assignee: Canon Kabushika Kaisha, Tokyo (JP)

( * ) Notice: Subject to any disclaimer, the term of this patent is extended or adjusted under 35 U.S.C. 154(b) by 0 days.

(21) Appl. No.: 08/953,731

(22) Filed: Oct. 17, 1997

(30) Foreign Application Priority Data

Oct. 18, 1996 (JP) .................................................... 8-257848
Oct. 13, 1997 (JP) .................................................... 9-279029

(51) Int. Cl.$^7$ .................................................... G06F 15/00
(52) U.S. Cl. .................................................... 358/1.18; 707/517
(58) Field of Search .................... 358/1.18; 707/910, 707/517, 525, 526, 527

(56) References Cited

U.S. PATENT DOCUMENTS

| | | | |
|---|---|---|---|
| 5,257,327 | * | 10/1993 | Hirosawa .............................. 382/235 |
| 5,357,348 | * | 10/1994 | Moro .................................... 358/450 |
| 5,483,621 | * | 1/1996 | Ohtaka ................................ 358/1.11 |
| 6,073,145 | * | 6/2000 | Funabashi ............................ 707/526 |

* cited by examiner

Primary Examiner—Yon J. Couso
(74) Attorney, Agent, or Firm—Fitzpatrick, Cella, Harper & Scinto

(57) ABSTRACT

An image processing system includes an input device which inputs an n page document, with the n pages being reduced in size so that a predetermined number of the n pages can be layed out in a layout print format on a single sheet for recording. A selection device selects between first and second layout modes for laying out the predetermined number of pages in the layout print format for recording. In the first layout mode the predetermined number of the n pages are first layed out in the layout print format and are subsequently stored in a storage device, and are then read from the storage device for recording on a single sheet. In the second layout mode the predetermined number of pages are first stored in the storage device on a page by page basis, are then read from the storage device and are subsequently layed out in the layout print format, and are then recorded on a single sheet.

18 Claims, 14 Drawing Sheets

FIG. 8A
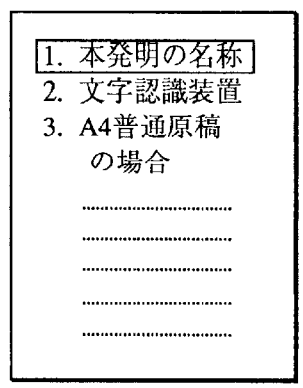
FIG. 8B
本発明の名称
FIG. 8C
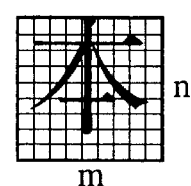
FIG. 8D
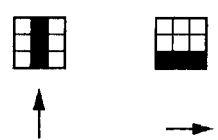

本 発 明 の 名 称

本発明の名称

FIG. 12A
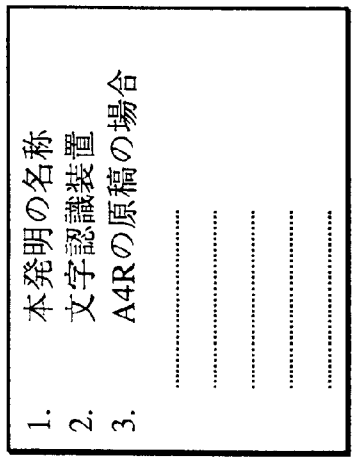
FIG. 12B
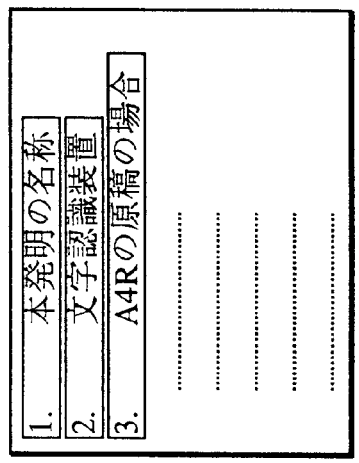
FIG. 12C
| 1. | 本発明の名称 |
|---|---|
| 2. | 文字認識装置 |
| 3. | A4Rの原稿の場合 |
FIG. 12D
| 1. | 本発明の名称 |
|---|---|
| 2. | 文字認識装置 |
| 3. | A4Rの原稿の場合 |

IMAGE PROCESSING APPARATUS HAVING A MODE FOR LAYING OUT A PREDETERMINED NUMBER OF PAGES OF A DOCUMENT ON A SINGLE SHEET FOR RECORDING

BACKGROUND OF THE INVENTION

1. Field of the Invention

The present invention relates to an image processing apparatus having a selected recording mode that permits a predetermined number of pages of image data to be laid out on a single sheet for recording.

2. Description of the Related Art

Digital image processing apparatuses such as a copier with an electronic sorting capability are available. In such digital image processing apparatus, an electronic sorting function is performed in which a document is read page by page and converted into document page image data, the document page image data is stored once in a storage device such as a hard disk, and the document page image data is then repeatedly read from the storage device to be printed out. Using the electronic sorting function, a contracted layout mode is presented in which a plurality of document page images of original document page data stored in the storage device are laid out in contracted (reduced) form in the order of page on a single sheet of paper.

When a layout function such as the contracted layout is performed, document page image data is stored in an image data storage device with the electronic sorting function. Two storage modes are available in storing image data: the image data is stored on a document page by document page basis in the first mode while the image data is stored in a layout of printout format in the second mode (i.e. a predetermined number of pages are stored together on a layout basis for printing on a single sheet).

In the second storage mode, the image data is stored after being layed out in a printout format. To modify the layout after reading the document image, document reading has to start over again. The second mode provides less flexibility in the modification of the layout.

In the first storage mode, layout modification is easily performed because the document is stored on a page by page basis, and layout for printing on a single sheet is performed after reading from the storage device. Since access is made to the storage device on a document page by document page basis, processing time required is long. Completing the outputting of the entire document takes time. The output cannot be initiated until all document pages are read. The first output of the document page is thus delayed.

SUMMARY OF THE INVENTION

It is an object of the present invention to provide an image processing apparatus that solves the above problems. More particularly, the object of the present invention is to provide an image processing apparatus which automatically selects between a first layout mode for laying out a predetermined number of pages together for storage in a memory and subsequent readout for printing on a single sheet, and a second layout mode for laying out a predetermined number of pages subsequent to the individual pages being read from the memory for printing on a single sheet, so that the image processing apparatus switches between the layout processing in the first layout mode and the layout processing in the second layout mode. The image processing apparatus efficiently image-processes by switchably meeting the requirement for flexibly complying the need of layout modification after document image reading and the requirement for obtaining the fast layout output of the image of the fed document.

To achieve the above object, the image processing apparatus of the present invention comprises input means for inputting a plurality of pages of image data; memory means for storing the image data input by the input means; selecting means for selecting between a first layout mode for laying out the image data when the image data input by input means is stored in the memory means and a second layout mode for laying out the image data when image data read from the memory means is output, in a mode setting that permits a predetermined number of pages of data to be laid out on a single sheet for recording thereon; and control means for switching between layout processing in the first layout mode and layout processing in the second layout mode, based on the selection made by the selecting means.

BRIEF DESCRIPTION OF THE DRAWINGS

FIGS. 8A–8D are explanatory drawings illustrating sensing the orientation of a document;

FIGS. 12A–12D are explanatory drawings illustrating sensing the orientation of a document;

DESCRIPTION OF THE PREFERRED EMBODIMENTS

First Embodiment

Figure 1:
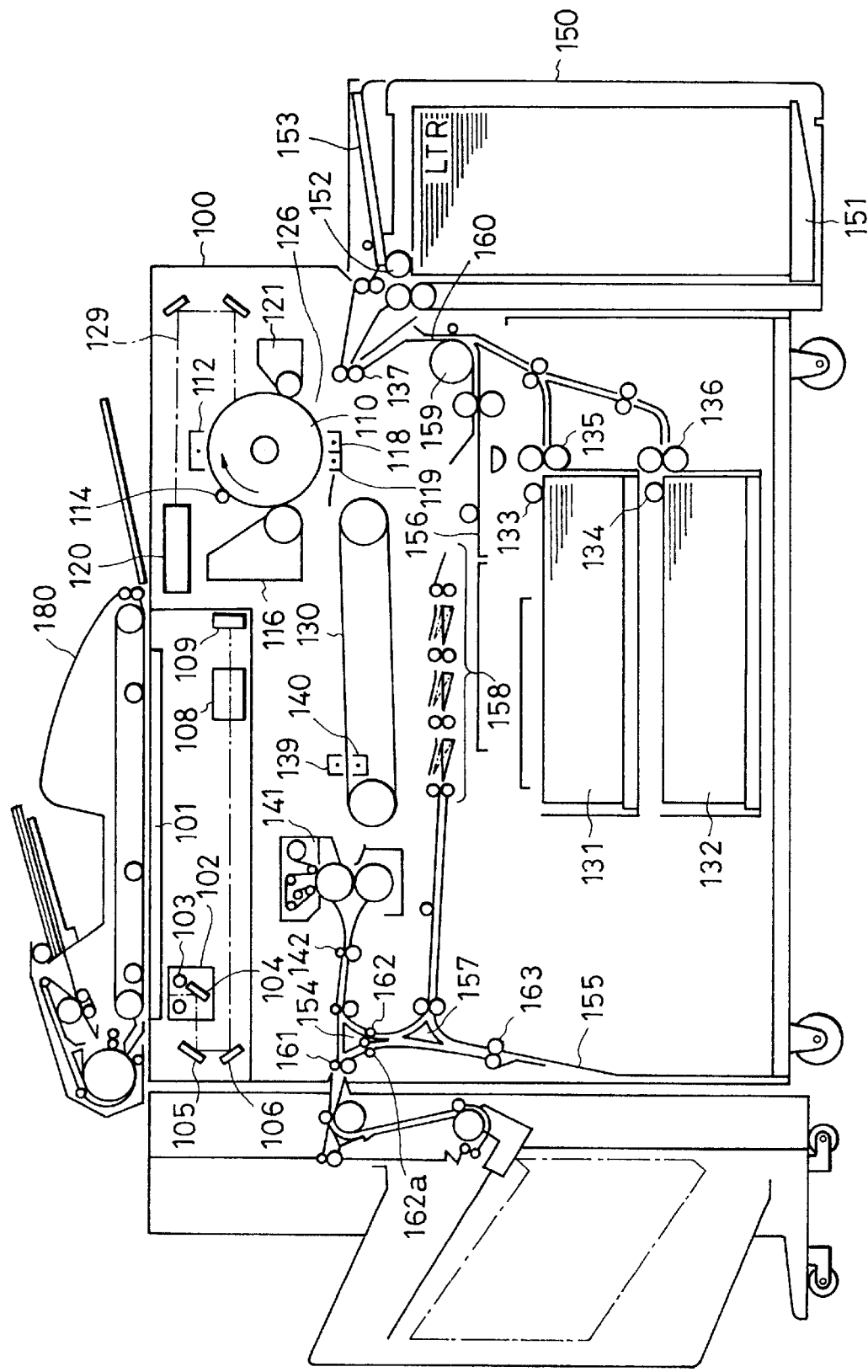
FIG. 1 is a sectional view showing the construction of one embodiment of the image processing apparatus.

FIG. 1 is a sectional view showing the construction of a first embodiment of the image processing apparatus.

Shown in FIG. 1 are a copying apparatus body 100 and a recirculating document feeder (RDF) 180. Shown further are a glass platen 101 as a document support and a scanner 102 comprising a document illuminating lamp 103, and a scanning mirror 104. The scanner 102 is driven to reciprocate in predetermined directions by an unshown motor. A reflected beam from the document is reflected by scanning mirrors 104–106, and is transmitted through a lens 108, and is focused on a CCD sensor (image sensor) 109.

An exposure control section 120, including a laser, a polygon scanner and the like, directs to a photoconductive drum 110 a laser beam 129 which is modulated according to an image signal. The image signal is obtained by converting the light beam reflected from the document into an electrical signal through the image sensor 109, and the image signal, before being used to modulate the laser beam, is subjected to a predetermined image processing to be described later. Arranged around the photoconductive drum 110 are a primary charger 112, a development unit 121, a transfer charger 118, a cleaning unit 116, and a pre-exposure lamp 114.

In an image forming section 126, the photoconductive drum 110 is rotated in the direction of the arrow by an unshown motor, and is irradiated with the laser beam 129 by the exposure control section 120 after being charged to a desired voltage by the primary charger 112. An electrostatic latent image is thus formed on the photoconductive drum 110. The electrostatic latent image formed on the photoconductive drum 110 is developed by the development unit 121 to be made visible as a toner image.

A copy paper sheet fed by pickup rollers 133, 134 from an upper cassette 131 or a lower cassette 132 is advanced to the copying apparatus body 100 by feed rollers 135, 136, and is then fed to a transfer belt by timing rollers 137. The visible toner image is thus transferred to the copy sheet by transfer chargers 118, 119. After transfer, a residual toner on the photoconductive drum 110 is removed by the cleaning unit 116, and residual charge thereon is cancelled by the pre-exposure lamp 114. After transfer, the copy sheet is detached from the transfer belt 130, and its toner image is re-charged with pre-fix chargers 139, 140. The copy sheet is then advanced to a fixing unit 141, which presses and heats the copy sheet, and is then delivered out of the copying apparatus body 100 by delivery rollers 142.

The copying apparatus body 100 is provided with a deck 150 that accommodates up to 4000 sheets of copy paper. A lifter 151 in the deck 150 is raised in accordance with the quantity of the copy sheets so that the feed roller 152 remains in contact with the copy sheets.

Also provided is a multi-copying manual feeder 153 capable of accommodating 100 sheets of copy paper. Shown further in FIG. 1 is a delivery flapper 154 which switches between a path for both-side recording or multiple recording and a path for delivery. The copy sheet advanced by delivery rollers 142 is guided to the both-side recording or multiple recording path by the delivery flapper 154. The copy sheet output by the delivery rollers 142 is turned topside down by an inverting path 155 and is transported to a re-feed tray 156 via a lower transport path 158. A switching flapper 157 switches between the path for both-side recording and the path for multiple copying. When the switching flapper 157 is tilted leftward, the copy sheet is directly advanced to the lower transport path 158 without being guided to the inverting path 155.

A feed roller 159 feeds the copy sheet to the photoconductive drum 110 via a path 160. Delivery rollers 161 arranged near the delivery flapper 154 deliver the copy sheet out of the apparatus when the delivery flapper 154 is switched to its delivery side. During the both-side recording (copying) and multiple recording (multiple copying), the delivery flapper 154 is raised upward so that the copy sheet copied is received in the re-feed tray 156 via the inverting path 155 and the lower transport path 158. The copy sheet is then held in the re-feed tray 156 with its top side down.

During both-side recording, the switching flapper 157 is tilted rightward. During the multiple recording, the copy sheets held in the re-feed tray 156 are guided to the timing roller 137 one by one by the feed roller 159 via the path 160. When the copying apparatus 100 determines that the copy sheet is to be delivered, the delivery flapper 154 is raised upward, the switching flapper 157 is tilted rightward, the copy sheet copied is guided to the inverting path 155, inverting rollers 163 transport the copy sheet to a second transport roller 162a after the backward edge of the copy sheet goes past a transport roller 162, and the delivery rollers 161 deliver the copy sheet topside down out of the apparatus.

Figure 2:
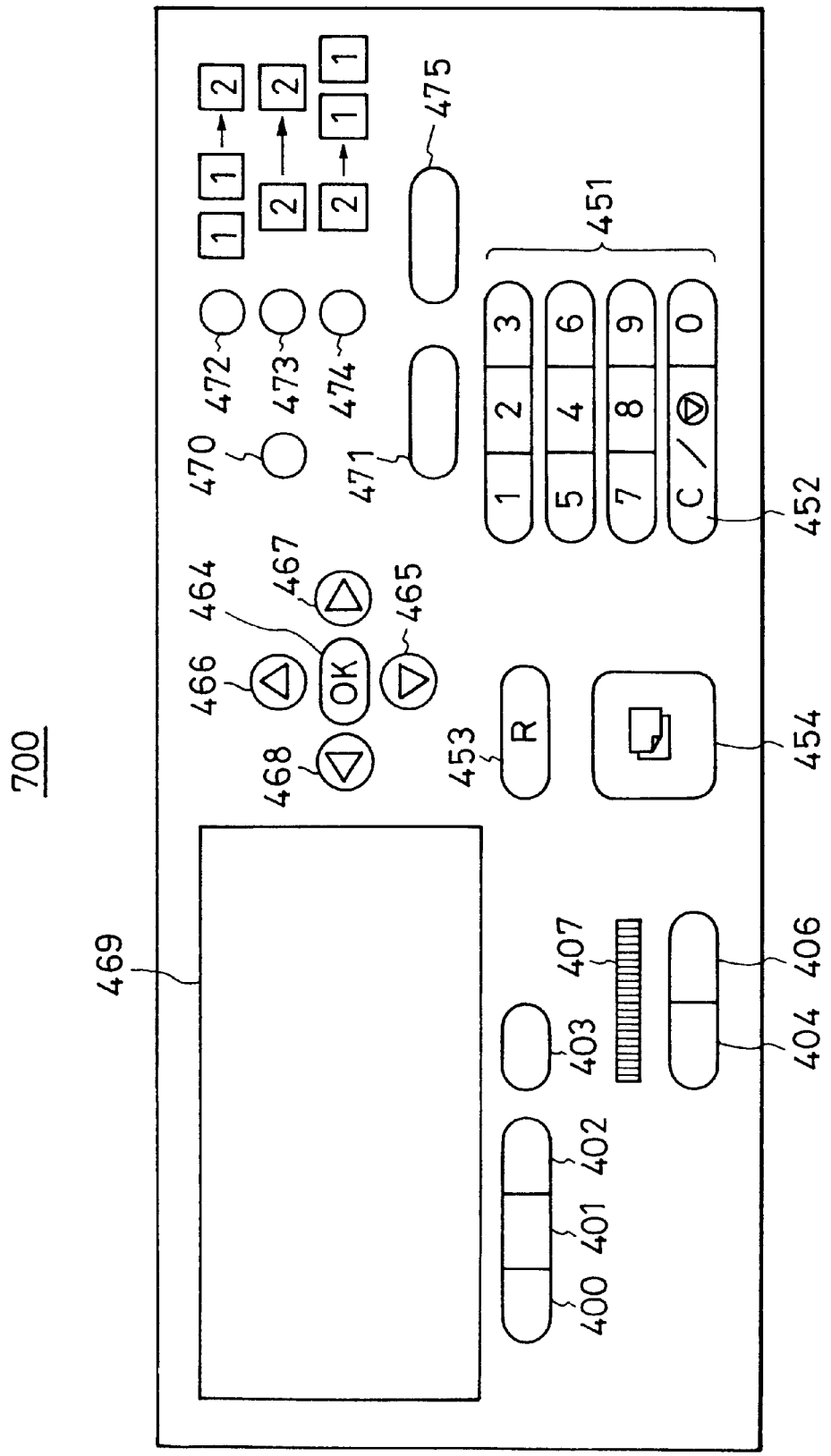
FIG. 2 is a plan view showing an operation block of the image processing apparatus of FIG. 1.

FIG. 2 is a plan view showing an operation block of the image processing apparatus of FIG. 1.

As shown, the operation block 700 has numeric keys 451 for inputting numeric values for setting the number of sheets for image forming and the setting of modes. A clear/stop key 452 is used to cancel the set number of sheets for image forming and to stop image forming operation. A reset key 453 is used to return the number of sheets for image forming, operation mode, and modes for selection of paper to their default setting. A start key 454, when pressed, starts an image forming operation.

A display panel 469 is constructed of a liquid crystal or the like, and changes its display content according to the set mode to facilitate detail mode setting (for example, setting a layout mode). In this embodiment, cursor keys 465–468 are used to move a cursor on the display panel 469, and an OK key 464 is used to accept the position of the cursor on the display panel 469. This arrangement may be replaced with a touchpad panel.

A paper type setting key 471 is used when image forming is performed on a recording medium thicker than that of standard recording paper. When a thick paper mode is set by the paper type setting key 471, an LED 470 lights. In this embodiment, only the thick paper mode is available. This function may be expanded such that a mode for special sheets such as OHP sheets is activated.

A both-side mode setting key 475 is available to select one of four modes: a "one-to-one mode" for one-side image output derived from one side of a document, a "one-to-both mode" for both-side image output from one side of the document, a "both-to-both mode" for both-side image output from both sides of the document, and a "both-to-one mode" for one-side image output from both sides of the document. LEDs 472–474 light depending on the mode selected. LEDs 472–474 are all extinguished in the one-to-one mode, LED 472 only lights in the one-to-both mode, LED 473 only lights in the both-to-both mode, and LED 474 only lights in the both-to-one mode.

A contraction key 400 and an expansion key 402 are respectively used to select a scale contraction and scale expansion from the size of the original. A full-size key 401 selects the full size of the original document (100%). A cassette selection key 403 selects one of an automatic paper selection, the upper cassette 131, lower cassette 132, deck 150, and manual feeder 153. Image density keys 404, 406 are available. Pressing the density key 404 increases the density of the image while pressing the density key 406 decreases the density of the image. An image density indicator 407 indicates the image density set by the image density keys 404, 406.

Figure 3:
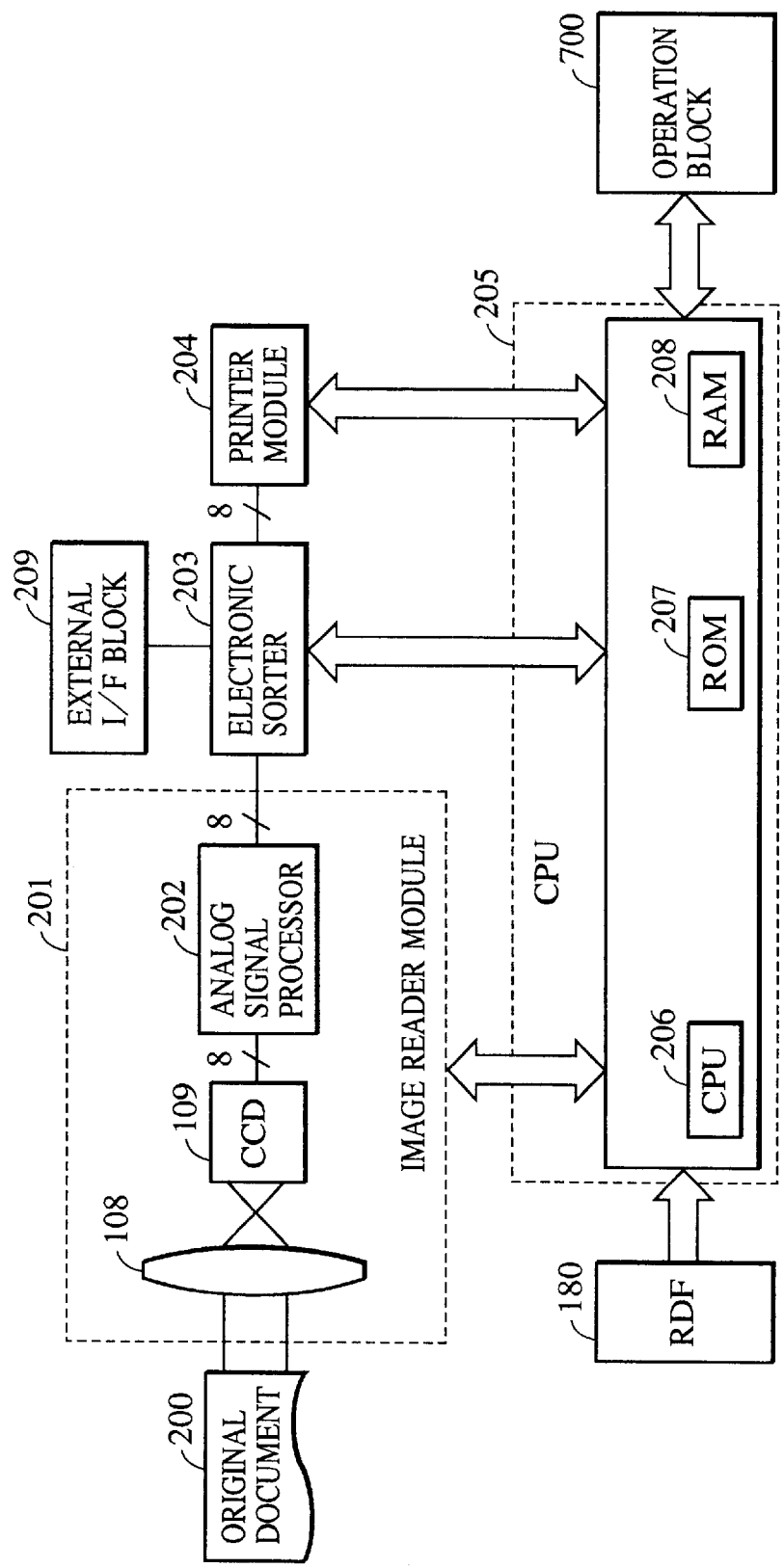
FIG. 3 is a block diagram illustrating the control system of the image processing apparatus.

FIG. 3 is a block diagram illustrating the control system of the image processing apparatus shown in FIG. 1, and like elements are identified with like reference numerals.

An image reader module 201 comprises a CCD sensor 109, an analog signal processor 202 and the like. A document image focused on the CCD sensor 109 via a lens 108 is converted into an electrical signal, which is then input to the analog signal processor 202. In the analog signal processor 202, the document information in the form of an electrical signal is subjected to a sample/hold process and correction of dark level, and is then analog-to-digital (A/D) converted. The digitized signal is subjected to shading corrections (for variations in characteristics of the image reading sensor and light distribution characteristics of the document illuminating lamp) and magnification process, and is fed to an electronic sorter 203.

An external interface processing block 209 expands image information input from an external computer, and is then input to the electronic sorter 203 as image data. The electronic sorter 203 performs correction processes required in the output system of the apparatus such as γ correction, smoothing process and edge enhancement, and the processed image data is output to a printer module 204. As shown in FIG. 1, the printer module 204 is constructed of the exposure control section 120 including the laser, image forming section 126, and a transport control block for a copy sheet, and records an image according to the image signal input.

A CPU circuit 205 includes CPU 206, ROM 207, RAM 208 and the like, and controls the image reader module 201, electronic sorter 203, and printer module 204, thereby generally controlling the sequence of the apparatus.

Figure 4:
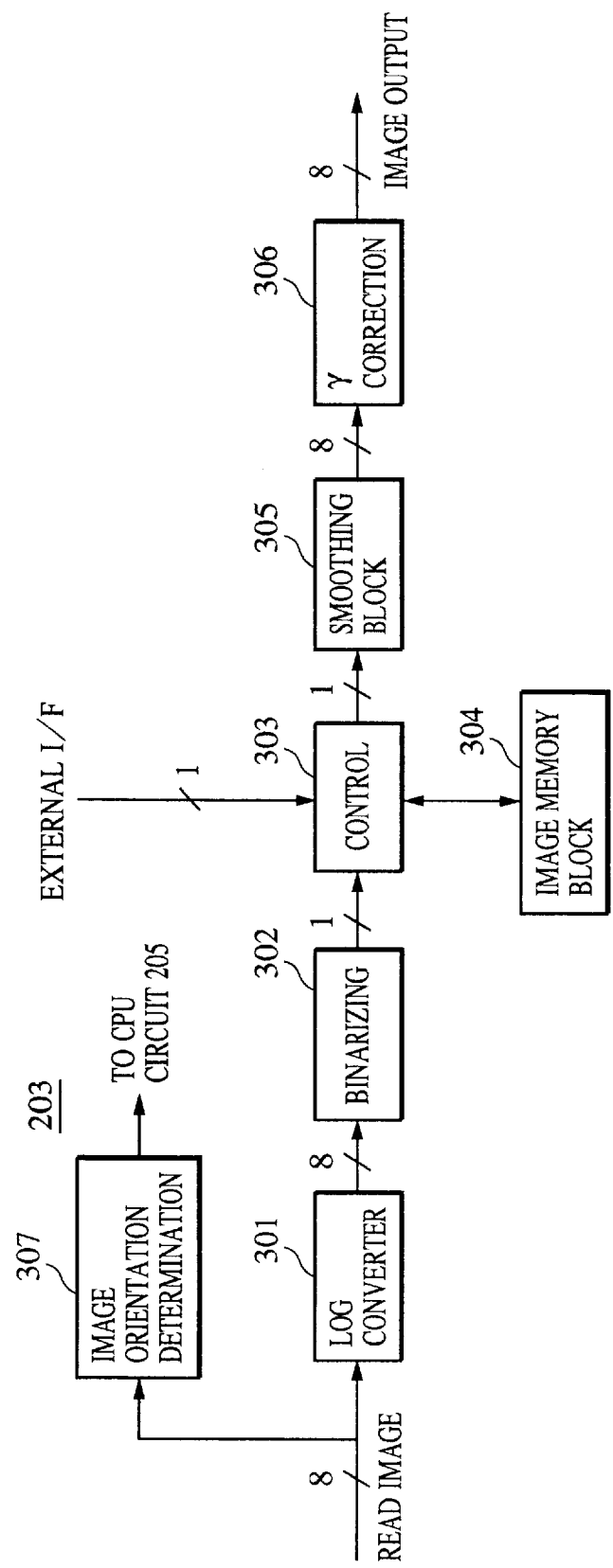
FIG. 4 is a block diagram illustrating, in greater detail, the electronic sorter 203 shown in FIG. 3.

FIG. 4 is a block diagram illustrating, in greater detail, the electronic sorter 203 shown in FIG. 3. The operation of the electronic sorter 203 is now discussed.

As shown, the data sent from the image reader module 201 is input as luminance data for black and fed to a log converter 301. The log converter 301 includes a lookup table (LUT) for converting the luminance data into density data. The log converter 301 converts luminance data into density data by outputting a tabled value corresponding to input data. The density data is then binarized by a binarizing block 302 into 0 and 255. Image data of 8 bits is binarized by binarizing block 302 into 1 bit image data of 0 or 1. Thus, the quantity of image data stored in the memory is reduced.

If the image is binarized, the number of gradations of the image changes from 256 to 2. Image data having a significant number of half tones, such as a photographic image, will be substantially degraded if binarized. For this reason, pseudo-halftones must be produced using the binarized data.

A spread error method is used to produce pseudo-halftones using binarized data. In this method, the density of an image is binarized: above a certain threshold, the image density is determined to be density data of 255; and when the density of the image is below the threshold, it is determined to be density data of 0. The difference between the actual density data and the binarized data is spread over the pixels surrounding a pixel of interest as an error signal. Error distribution is Performed as follows: the errors produced by the binarizing operation are respectively multiplied by weights (coefficients) prepared beforehand in a matrix and the resulting values are added to the surrounding pixels. In this way the density mean value of the entire image is retained, and the pseudo-half tones are thus expressed as binarized values.

The image data binarized by the binarizing block 302 is sent to a control block 303. The image data input by a computer or the like is processed into binarized image data by the external interface processing block 209, and is directly fed to the control block 303. In response to instructions from the apparatus, the control block 303 stores once in a image memory block 304 the image of the document page to be copied and reads and sequentially outputs image data from the image memory block 304.

The image memory block 304 has a SCSI controller and a hard disk (memory) and writes the image data onto the hard disk in response to instructions from the SCSI controller. A plurality of image data stored in the hard disk are output in an order in accordance with the edit mode specified by the operation block 700. In a sorting operation, for example, a stack of document pages from RDF 180 are sequentially read from the final page to the front page, and are stored in the image memory block 304 equipped with a hard disk. The image data of the documents stored once in the hard disk are repeatedly output in the order from the final document page to the front document page. In this way, the image memory block 304 works in the same way as a sorter with a plurality of delivery bins.

The image data read from the image memory block 304 is sent to a smoothing block 305. The smoothing block 305 converts 1-bit data into 8-bit data as image data of 0 or 255. The converted image data is replaced with a weighted mean that is obtained by multiplying predetermined coefficients in a matrix by density values of surrounding pixels and then summing the multiplied values. The binarized data is converted into multi-valued data in accordance with the density values of the surrounding pixels. The apparatus forms an image looking more like the read image.

The smoothed image data is input to a γ correction block 306. Before outputting density data, the γ correction block 306 converts it according to the lookup table (LUT) reflecting the characteristics of the printer, thereby adjusting the output according to the density value set in the operation block 700.

An image orientation determination block 307 receives the image from the image reader module 201 to determine the orientation of the text, thereby determining the orientation of the document image. Referring to FIGS. 8A–8D through 12A–12D, the image orientation sensing method by the image orientation determination block 307 shown in FIG. 4 is discussed.

Figure 10:
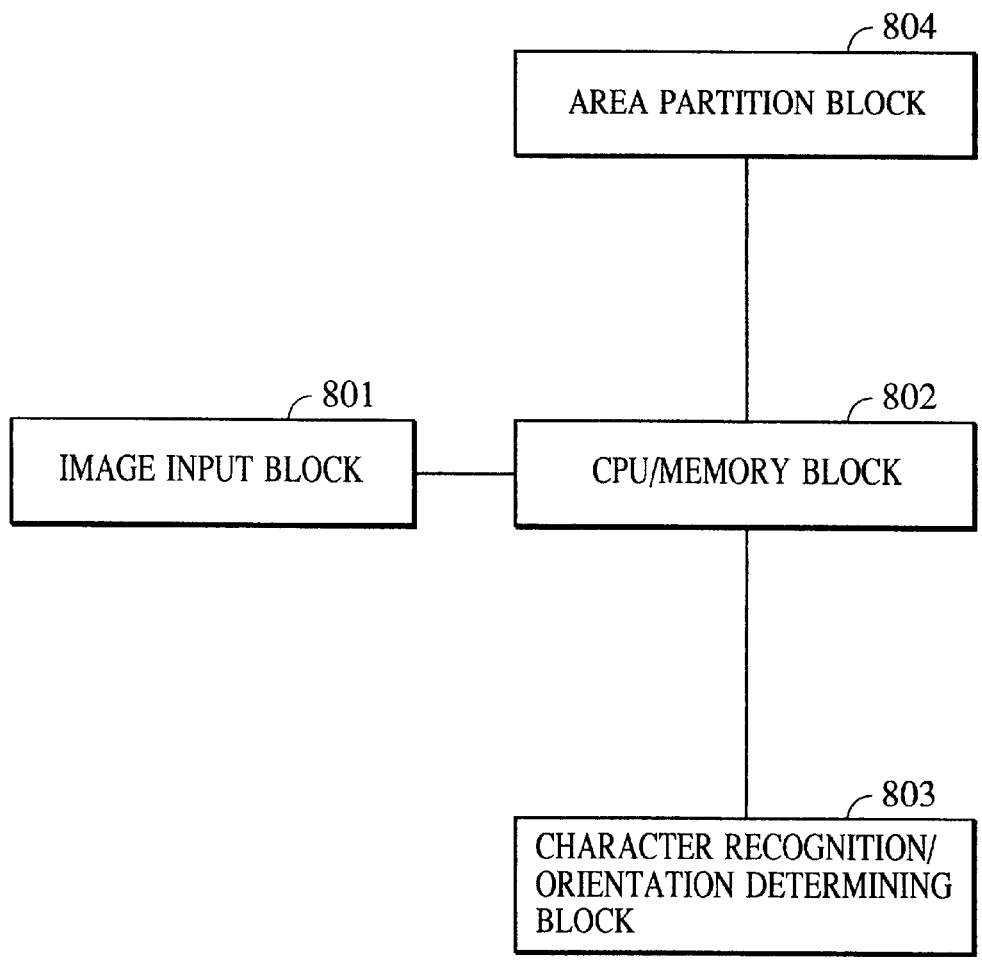
FIG. 10 is a block diagram of the image orientation block 307 of FIG. 4.

FIG. 10 is a block diagram showing the image orientation determination block 307 in this embodiment. As shown, an image input block 801 receives the image data from the image reader module 201 in FIG. 4.

A CPU/memory block 802 converts the image data into one having a resolution required for the determination of the image orientation and temporarily stores the image data, while sensing the orientation of the image. Based on the fact that the characters reflect most accurately the orientation of the text, a character recognition/orientation determining block 803 performs character recognition to character areas of a few types within a text at angles of 0°, 90°, 180°, and 270° and determines, as the text orientation, the angle presenting the most accurate recognition (confidence level of character recognition: distance to feature distribution of character) among the character recognitions. An area partitioning block 804 performs a pre-process prior to the character recognition/orientation determining process by the character recognition/orientation determining block 803, and, more particularly, partitions a text area, a drawing area, a photographic area, and a table area into rectangular areas based on the document image data, and attaches an attribute to each area (text area, for example).

Figure 11:
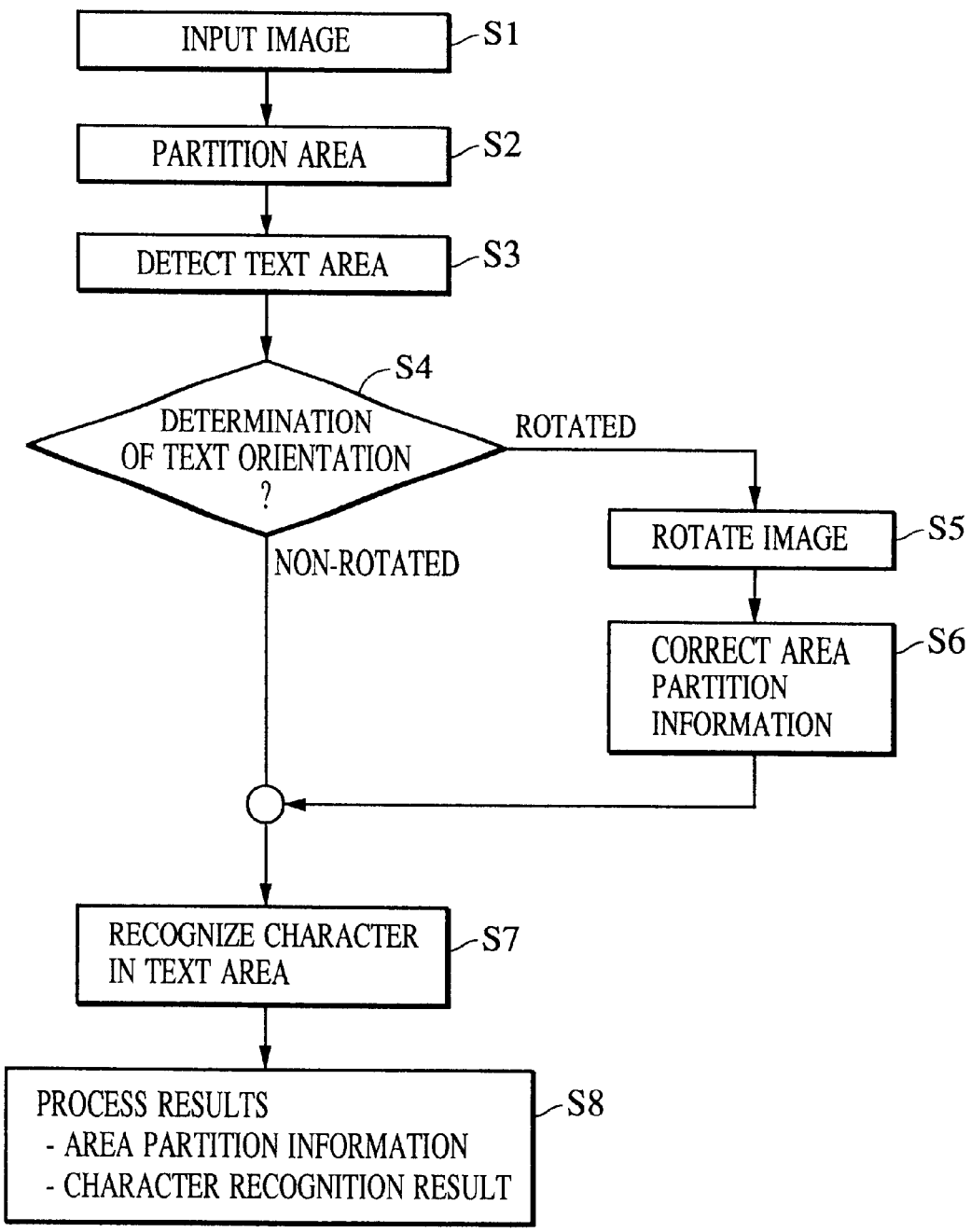
FIG. 11 is a flow chart of the text orientation automatic determination correction and character recognition process.

Referring to the flow diagram of FIG. 11, the text orientation automatic determination, correction and character recognition processes in the embodiment are now discussed. The image data (multi-valued data) input by the image input block 801 is first partitioned into rectangular areas by attributes such as the text area, drawing area, photographic area, and table area (steps S1, S2). In these steps, area information such as enclosed rectangles is actually created. Referring to the attributes, the rectangle information of the text area is extracted (step S3). The text area may be sentences, titles, characters within a table, and captions of drawings.

For example, text information shown in FIGS. 12A and 12C is extracted as rectangle information for text areas shown in FIG. 12B and 12D. A few areas are used to determine the orientation of the text (step S4). When the text is oriented in the standard direction, the character recognition is accomplished in the text area in the image (step S7). If the text orientation is not standard, the image is rotated to a correct direction (step S5). The rotated image is subjected to area partition and a correction process of area partition information (step S6).

The process in this step corrects the difference of the area partition information introduced in the image rotation. In one method, the entire rotated image data is again subjected to the area partition process. In another method, address conversion is applied to the area partition results. Since the area partition process is generally based on the assumption that the image is in its standard orientation, the result of an the area partition process performed at an initial stage is typically different from the result of an area partition process performed to the rotated image data. For this reason, the first method is preferred. Next, the process goes to step S7, where the text area block within the rotated image data is subjected to character recognition in the character recognition system. As a result, both the area partition information and character recognition information are obtained in both cases of rotation and no-rotation (step S8). The process results is reported to the CPU circuit 205 shown in. FIG. 3. The CPU circuit 205 uses the character recognition information to perform image rotation, thereby controlling the binding position of a sheet delivery section.

The text orientation determination using the character recognition process is now discussed. The area partition process senses black pixels of the document image data, and creates a rectangular outline of a black pixel area by outline following or a labeling method. The density of black pixels within the rectangle, the presence or absence of an adjacent rectangle, and the aspect ratio of width to height serve as determination criteria in determining the text area (a title, a body, a caption), the drawing area, the photographic area, and the table area. The process result determines the rectangle information of the text area.

Figures 9A, 9B, 9C:
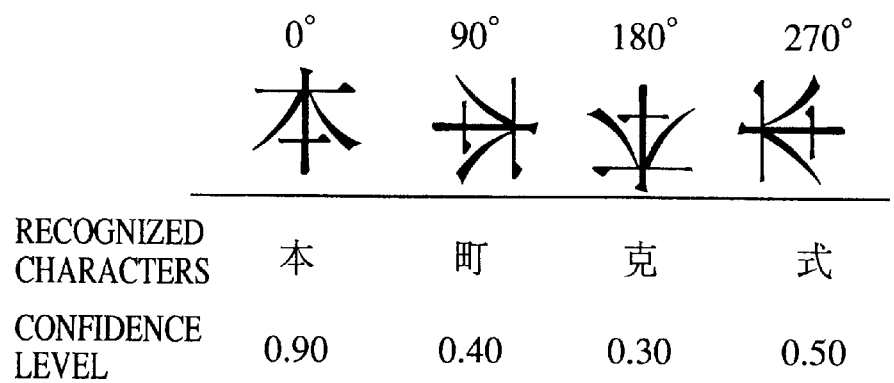
FIG. 9A–9C are explanatory drawings illustrating sensing the orientation of a document.

As one of character recognition processes, feature vector extracting and comparison method is available. As shown in FIG. 8A, suppose that a text area including the character "本" is now determined. In a first step, a character slicing operation is performed to the text area (see FIG. 8B). This process is used to pick up a while FIG. 9B shows a 270° rotated text. When the orientation of "本" is determined, character recognition is performed to the character "本" at four directions of 0°, 90°, 180°, and 270°. The angle of rotation is changed by changing the direction of reading in the area of the character rectangle, and there is no need for rotation of the document. The character recognition results are different depending on the angle of rotation as shown in FIG. 9C. FIG. 9C shows tentative character recognition results for the purpose of illustration and their associated confidence levels, and does not necessarily agree with actual results. As shown in FIG. 9C, when character recognition is performed at the standard direction (0°), the character "本" is correctly recognized, and the resulting confidence level is as high as 0.90. When character recognition is performed at 90°, the character "本" is erroneously recognized as "町" and the confidence level drops down to 0.40. Since the character recognition is performed based on the feature vector at the angle of rotation, such an erroneous recognition results and confidence level drops. Likewise, an erroneous recognition results with the confidence level dropping when character recognition is made at angles of 180° and 270°. The more complex the character, the more pronounced difference appears in the confidence level of the character recognition by angle. In the results in FIG. 9C, the confidence level is the highest at the standard direction, and it is determined that the text most probably is oriented in the standard direction. To enhance the accuracy of the slice of a rectangle for one character, and is performed by sensing the continuity state of black pixels. In a second step, one character is sliced into a pixel block of m×n (64×64, for example) (see FIG. 8C). Using a window of 3×3 pixels, the direction of distribution of the black pixels (direction vector information, see FIG. 8D) is extracted. FIG. 8D shows parts of the direction vectors. By sliding the 3×3-pixel window, several magnitudes of pieces of the direction vector information are obtained. The vector information is the feature of each character.

The feature vector is compared with the content of a stored character recognition dictionary, and the characters are extracted in the order from the closest to closer to the feature vector. In this case, the characters in the order from the closest to closer to the feature vector are as follows: a first candidate, a second candidate, a third candidate, . . . The closeness of the feature of the character to the feature vector is a closeness in distance to the character, namely the value representing the confidence level (accuracy) of the character recognition.

The confidence level of character recognition is determined in this way in the text orientation determination process. The text orientation determination process based on the confidence level is discussed using a text "本発明の名称" in FIGS. 9A, 9B, and 9C. FIG. 9A shows a correctly oriented text character recognition, a plurality of characters within the same area block are likewise subjected to character recognition at four angles. If character orientation is determined within the same area block, a special character may be erroneously determined. Character recognition is preferably performed in a plurality of area blocks. The mean value of the confidence level of the characters of interest at each of the four directions is determined in each of the area blocks. The mean value derived from the area blocks are averaged at each of the four directions, and one direction presenting the highest mean value is determined as the character (text) orientation. Rather than determining the text orientation using the confidence level of a single character, a plurality of characters in the same area block, and furthermore the plurality of characters in other area blocks are considered together to determine the confidence level and the character (text) orientation. Alternatively, the confidence level of a single character or the confidence levels of a plurality of characters within the same area block may be used to determine the text orientation. This arrangement still presents a more accurate text orientation than the conventional art. Since character recognition is performed followed by orientation determination in the determination of an image orientation process, image reading cannot be concurrently performed.

Figure 5:
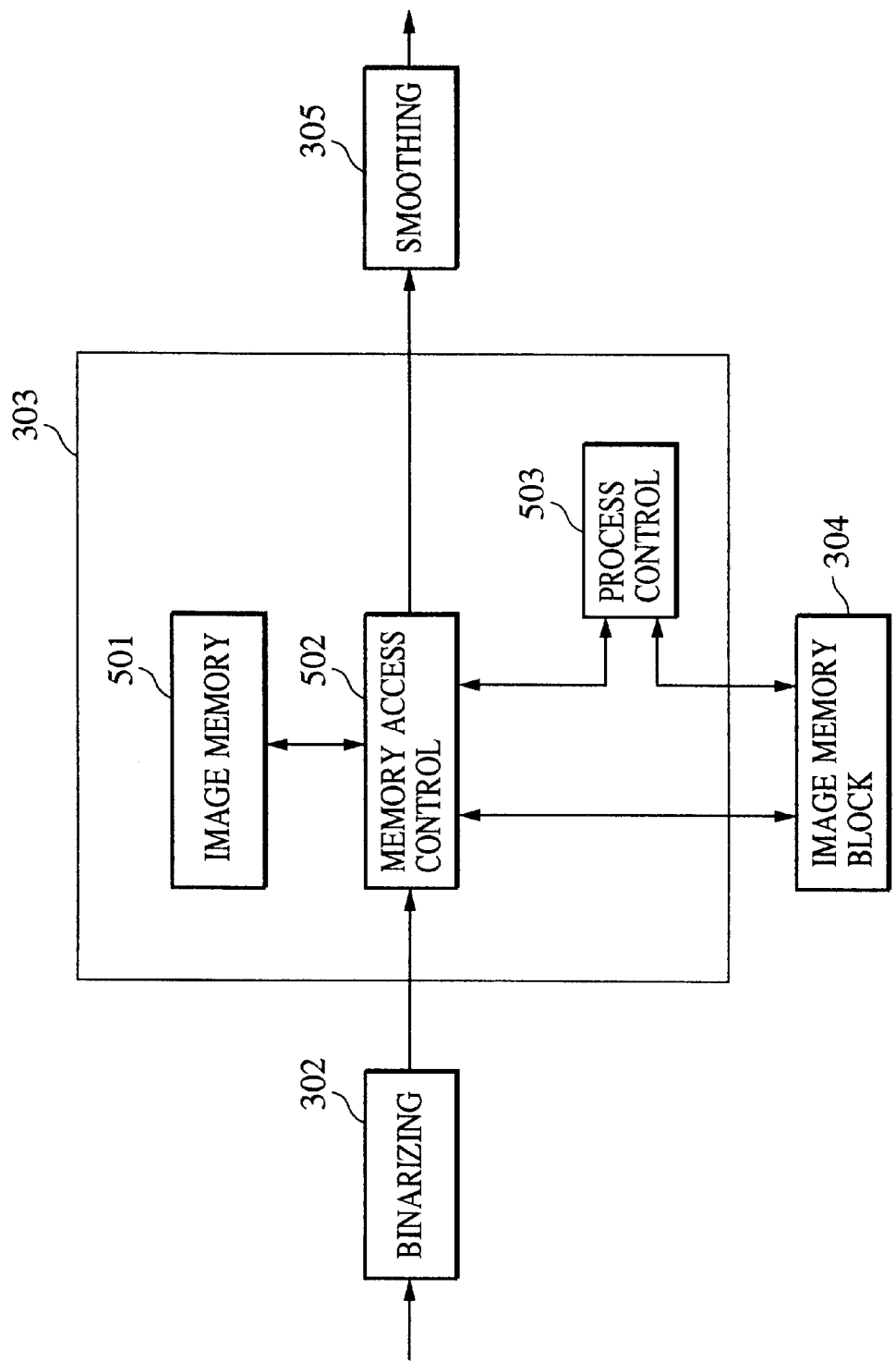
FIG. 5 is a block diagram illustrating the control block shown in FIG. 4.

FIG. 5 is a block diagram of the control block 303 shown in FIG. 4. The construction and operation of the control block 303 are now discussed.

An image memory 501 is constructed of a DRAM and the like, and stores a video write signal from the binarizing block 302 via a memory access control block 502, a video read signal to the smoothing block 305, and a video input/output signal to the image memory block 304. The memory access control block 502 generates a DRAM refresh signal for the image memory 501 and arbitrates signals flowing from the binarizing block 302, smoothing block 305 and image memory block 304 to the image memory 501. In response to an instruction from a process control block 503, the memory access control block 502 controls the write address, reading address and the direction of read to the image memory 501.

The process control block 503 controls the layout function for laying out a plurality of document images in the image memory 501 and outputting the resulting contracted image to the printer module 204, the function of outputting a slice of the image, and the image rotation function.

Figure 6:
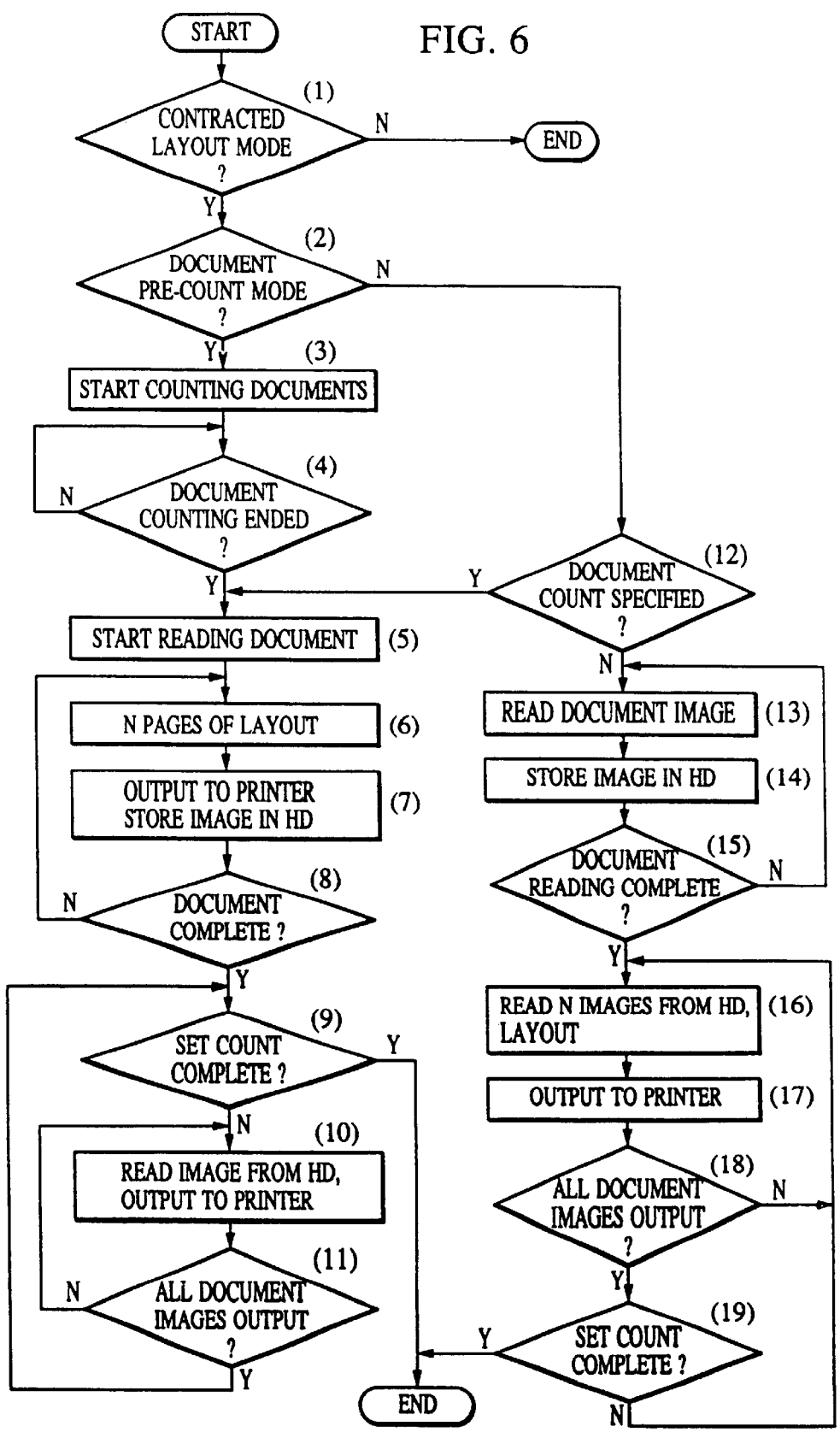
FIG. 6 is a flow diagram illustrating a first layout processing in the image processing apparatus of the present invention.

FIG. 6 is a flow diagram illustrating a first layout processing in the image processing apparatus of the present invention. The steps (1)–(19) in the process correspond to the process by the process control block 503 for image contracted layout. The process is called by the main sequence at regular intervals or as necessary.

In step (1), a determination is made of whether the current mode is a contracted layout mode. When the current mode is other than the contracted layout mode, the process control block 503 exits this process. The contracted layout mode is the mode for laying out and outputting a plurality of document page images on a single recording medium. The document page images are arranged starting with a first page. For example, a designation 4 in 1 layout means that four original document page images are laid out on a single recording medium with no superimposed portions therebetween.

When the determination in step (1) is YES, a determination is made of whether the setting requires document page counting prior to image forming and image reading in the contracted layout mode (step (2)). When the setting is determined not to be the document pre-count mode, the sequence goes to step (3). When the setting is determined not to be the document pre-count mode, the sequence goes to step (12). RDF 180 performs document page counting by sequentially feeding all document pages without reading them, prior to a reading operation.

Document page counting starts in step (3), and the sequence goes to step (4) where a determination is made of whether document page counting is complete. When document page counting is not complete in step (4), the sequence stays there until the end of document page counting.

When document page counting is complete in step (4), the sequence goes to step (5) where document page reading starts. The sequence then goes to step (6). In step (6), the number of contracted layout pages is N, for example, in case of 4 in 1 layout, four original document pages are read, and the layout image is output to the image memory 501. The layout process in step (6) is performed in accordance with the number of document pages counted or specified, such that no blank is created before a first page.

The sequence goes to step (7) where the image for the first page of the recording medium laid out by the image memory 501 is output to the printer module 204 while being stored in the hard disk (HD) at the same time. The sequence goes to step (8). A determination is made of whether all document pages are read. When all document pages are not yet read, the sequence returns to step (6) where document page reading is repeated.

When all document pages are read in step (8), the sequence goes to step (9). A determination is made of whether the number of set copies by the operation block 700 is complete. When the outputting for the number of set copies is complete, the sequence ends.

When the outputting for the number of set copies is not complete in step (9), the sequence goes to step (10). The image processed in the output form to the recording medium is read from the hard disk in the image memory block 304, is expanded in the image memory 501, and is then output to the printer module 204. The sequence goes to step (11) where a determination is made of whether all document pages images are read from the hard disk in the image memory block 304 and output to the printer module 204. When all document pages images are not yet output, the sequence returns to step (10). The document page images are repeatedly output from the image memory block 304 to the printer module 204. The number of outputs or the number of repetitions of image reading from the image memory block 304 is the number of document pages divided by the number of layouts N in the contracted layout. When all document page images are complete in step (11), the sequence returns to step (9) where a determination is made of whether the number of set copies is complete.

When the setting is determined not to be the document pre-count mode, the sequence goes to step (12). A determination is made of whether the document page count is specified by an operator in the contracted layout mode. When the operator enters the document pages count, the sequence goes to step (5) where the same process as the number of document pages counted rather than specified is performed.

When the document page count is not specified in step (12), the sequence goes to step (13) where the document page images are read. In step (14), the document page images are stored in the image memory block 304 while the number of document pages are concurrently counted. In step (15), a determination is made of whether all document pages are read. When the storing of all document pages in the hard disk is complete, document pages counting is also complete. When the reading of all document pages is not complete in step (15), the sequence returns to step (13) where document page reading is continued. When the reading of all document pages is complete in step (15), the sequence goes to step (16). The images of the document pages are read from the image memory block 304 and are laid out in the image memory 501 in the control block 303. The layout process in step (16) is performed in accordance with the number of document pages, such that no blank is created before a first document page.

When N pages of document page images are laid out in the image memory 501, the sequence goes to step (17) where the layout image is output to the printer module 204.

It is determined in step (18) whether the image output corresponding to the document page count is output. When the image output corresponding to the document page count is not yet complete, the sequence returns to step (16) where the process is repeated until all document images are output.

When it is determined in step (18) that the image outputting corresponding to the document page count is complete, the sequence goes to step (19). It is determined in step (19) whether the number of output copies set by the operation block 700 is output. When the output of the number of output copies set is not complete, the sequence returns to step (16), and steps (16)–(18) are repeated until the number of set copies is complete.

When it is determined in step (19) that the output of the number of the set output copies is complete, the sequence ends.

When the number of document pages is not a multiple of N, the output for the copy sheet bearing the final document page includes a blank area in succession to the final document page.

As described above, during the pre-count mode or when the document page count is specified by the operator, image layout is performed during document page reading and the layout image is stored in the image memory block 304.

Neither in the pre-count mode nor when the document page is specified by the operator, are the document pages read and stored in the image memory block 304. After all document page images are read, the document page images are read from the image memory block 304 and laid out and output to the printer.

Although the contracted layout mode has been described in this embodiment, the same description applies to other layout modes.

Second Embodiment

In the first embodiment, the first layout mode or the second layout mode is selected depending on the setting of the document count mode in the operation block 700. Alternatively, determining the possibility of feeding a front document of a stack of documents placed on the document support of RDF 180, the first layout mode or the second layout mode may be selected and the layout output process may be controlled.

Figure 7:
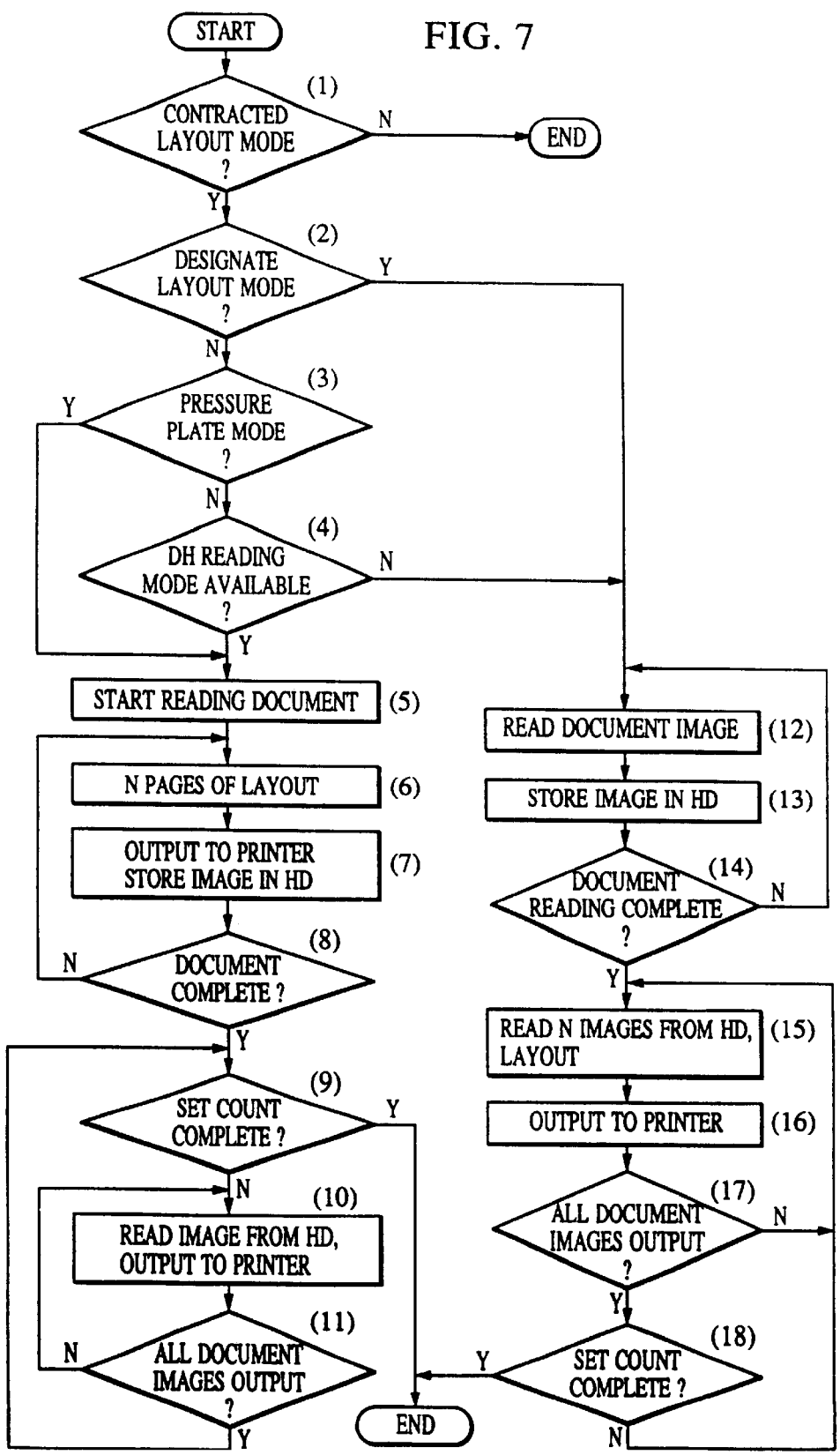
FIG. 7 is a flow diagram illustrating a second layout processing in the image processing apparatus of the present invention.

FIG. 7 is a flow diagram illustrating a second layout processing in the image processing apparatus of the present invention. The steps (1)–(18) in the process correspond to the process by the process control block 503 during image contracted layout. The process is called by the main sequence at regular intervals or as necessary.

In step (1), a determination is made of whether the current mode is a contracted layout mode. When the current mode is other than the contracted layout mode, the process control block 503 exits this process.

It is determined in step (2) whether the operator designates a mode enabling the reset of a layout subsequent to the end of reading. When it is determined that the mode is designated, the sequence goes to step (12).

When it is determined that the mode is not designated, the sequence goes to step (3). It is determined in step (3) whether the mode is a reading mode (pressure plate mode), namely, the mode in which the documents are placed on the glass platen, one by one, by the operator rather than by RDF 180. When it is determined that the mode is the pressure plate mode, the display panel 469 of the operation block 700 presents a message indicating that image reading starts with a first page. The sequence goes to step (5).

When it is determined in step (3) that the mode is not the pressure plate mode, the sequence goes to step (4). The process control block 503 reads the model code of RDF 180 to determine whether RDF 180 has a mode for starting with a front page in reading a document. When it is determined that RDF 180 cannot start with the first page, the sequence goes to step (12).

When it is determined in step (4) that RDF 180 can read starting with the first page, the sequence goes to step (5). The document reading operation starts, and the sequence goes to step (6). In case of the pressure plate mode, the operator is requested to give a start instruction for reading each page of the N-page document.

In step (6), the number of contracted layout document pages is N, for example, in case of final layout, four original document pages are read, and the layout image is output to the image memory 501. The layout process in step (6) is performed such that no blank is created before a first document page. The sequence goes to step (7) where the image for the first page of the recording medium laid out by the image memory 501 is output to the printer module 204 while being stored in the hard disk (HD) in the image memory block 304 at the same time. The sequence then goes to step (8). A determination is made of whether all document pages are read. When all document pages are not yet read, the sequence returns to step (6) where document page reading is continued.

When all document pages are read in step (8), the sequence goes to step (9). A determination is made of whether the number of copies set by the operation block 700 is complete. When the output for the number of set copies is complete, the sequence ends.

When the output for the number of set copies is not complete in step (9), the sequence goes to step (10). The image processed in the output form to the recording medium is read from the hard disk in the image memory block 304, is expanded in the image memory 501, and is then output to the printer module 204. The sequence goes to step (11) where a determination is made of whether all document page images are read from the hard disk in the image memory block 304 and output to the printer module 204. When all document page images are not yet output, the sequence returns to step (10). The document page images are repeatedly output from the image memory block 304 to the printer module 204. The number of outputs or the number of repetitions of page image reading from the image memory block 304 is the number of document pages divided by the number of layouts N in the contracted layout.

When the reading of all document page images is complete in step (11), the sequence returns to step (9) where a determination is made of whether the number of set copies is complete.

When it is determined in step (2) that the designate layout mode is designated or when it is determined in step (4) that RDF 180 cannot read starting with the first document page, the sequence goes to step (12). The document page images are read in step (12), and the sequence goes to step (13) where the document page images are stored in the image memory block 304. It is determined in step (14) whether the reading of all document page images is complete. When the reading of all document page images is not yet complete, the sequence goes to step (12) where the reading of document page images is continued. In case of the pressure plate mode, the operator is requested to give a start instruction for reading each document page of the N-page document.

When it is determined in step (14) that the reading is complete, the sequence goes to step (15). The page images are read from the image memory block 304, and are laid out in the image memory 501 in the control block 303. The layout in step (15) is performed such that no blank is created before a first document page. When the N-page document images are laid out in the image memory 501, the sequence goes to step (16) where the layout images are output to the printer module 204.

The sequence then goes to step (17) where it is determined whether the output of the document page images covers the full document page count. When the full document pages are not yet output, the sequence returns to step (15) where relevant steps are repeated until the full document pages are output.

When it is determined in step (17) that the output of the images covers the full document page count, the sequence goes to step (18). It is determined in step (18) whether the number of copies set in the operation block 700 is complete. When it is determined that the number of set copies is not complete, the sequence returns to step (15) and steps (15)–(17) are repeated until the number of set copies is complete.

When it is determined in step (18) that the number of set copies is complete, the sequence ends.

When the number of document pages is not a multiple of N, the output for the copy sheet bearing the final document page includes a blank area in succession to the final document page.

Third Embodiment

Figure 13:
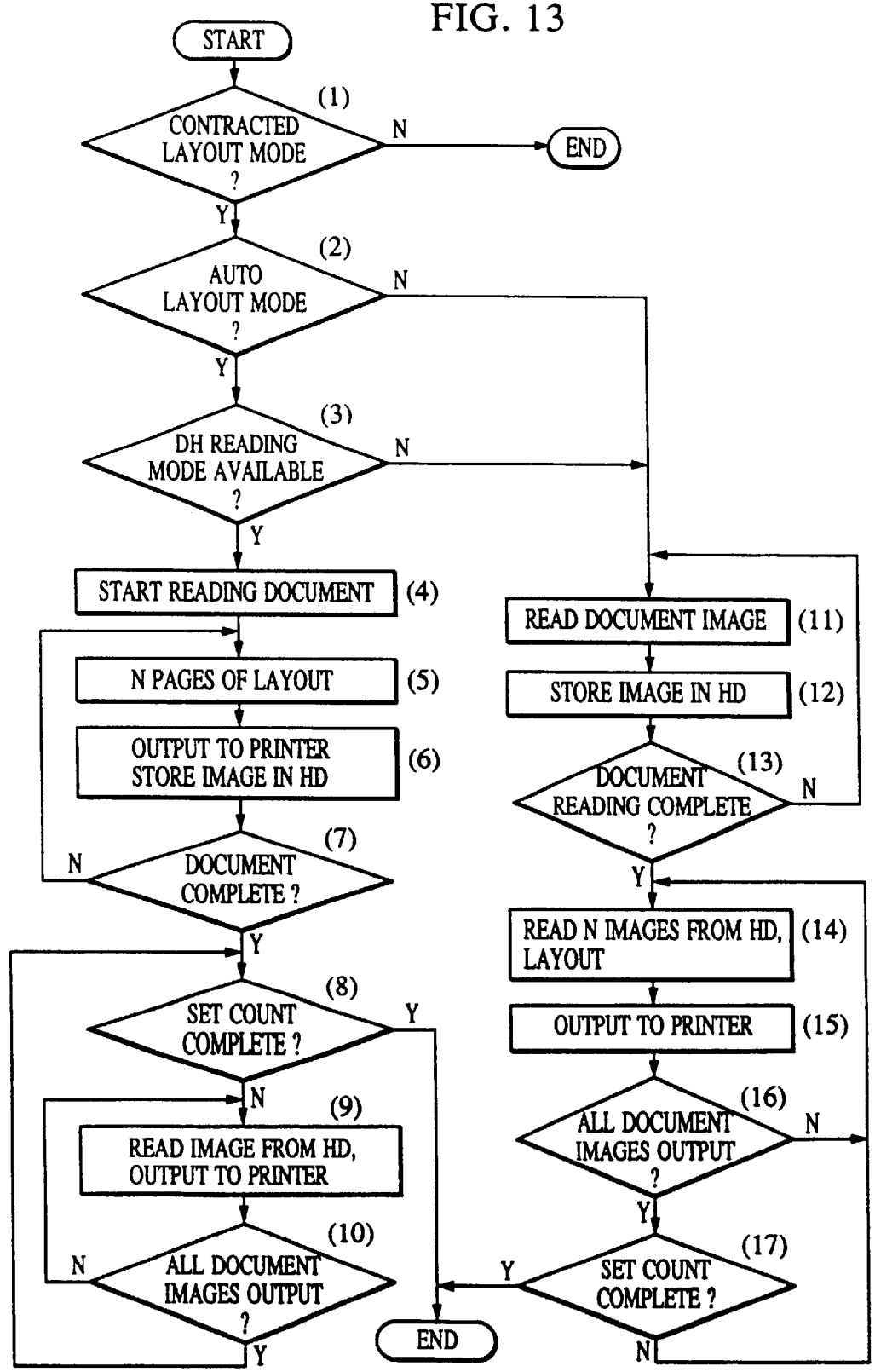
FIG. 13 is a flow diagram illustrating a third layout processing in the image processing apparatus of the present invention.

Referring to FIG. 13, a third embodiment of the present invention is discussed. In the third embodiment, image orientation determining means switches between the first layout mode and the second layout mode depending on the presence or absence of an automatic mode for controlling the layout order of images. FIG. 13 is a flow diagram illustrating a third layout processing in the image processing apparatus of the present invention. The steps (1)–(17) correspond to the process the process control block 503 performs during the image contracted layout. The process is called by the main sequence at regular intervals or as necessary.

In step (1), a determination is made of whether the current mode is a contracted layout mode. When the current mode is other than the contracted layout mode, the process control block 503 exits this process.

In step (2), a determination is made of whether the layout mode designated by the operator is an automatic mode for image orientation. More particularly, it is determined whether the layout mode designated by the operator is either the automatic layout mode in which the orientation of layout is automatically determined by determining the orientation of the original document image or a manual layout mode in which the layout process is performed at the orientation of the original document image aligned with the direction of the document support and in the position of the original document designated by the operator through the operation block 700. When the mode is not the automatic layout mode, the sequence goes to step (11). When the mode is the automatic mode in step (2), the sequence goes to step (3). The process control block 503 reads the model code of RDF 180 to determine whether RDF 180 has a function for starting with a front document page in feeding the document pages. When it is determined that RDF 180 has the function for starting with the front document page, the sequence goes to step (4). The document page reading operation starts, and the sequence goes to step (5). In step (5), the number of contracted layout pages is N, for example, in case of a 4 in 1 layout, four original documents are read, and the layout image is output to the image memory 501. The sequence goes to step (6) where the image for the first document page of recording medium laid out by the image memory 501 is output to the printer module 204 while being stored in the hard disk (HD) in the image memory block 304 at the same time. The sequence goes to step (7). A determination is made of whether all document pages are read. When all documents are not yet read, the sequence returns to step (5) where document page reading is continued.

When all document pages are read in step (7), the sequence goes to step (8). A determination is made of whether the number of copies set by the operation block 700 is complete. When the outputting for the number of set copies is complete, the sequence ends.

When the outputting for the number of set copies is not complete in step (8), the sequence goes to step (9). The image processed in the output form to the recording medium is read from the hard disk in the image memory block 304, is expanded in the image memory 501, and is then output to the printer module 204. The sequence goes to step (10) where a determination is made of whether all document page images are read from the hard disk in the image memory block 304 and output to the printer module 204. When all document page images are not yet output, the sequence returns to step (9). The document page images are continuously output from the image memory block 304 to the printer module 204. The number of outputs or the number of repetitions of image reading from the image memory block 304 is the number of document pages divided by the number of layouts N in the contracted layout.

When the reading of all document images is complete in step (10), the sequence returns to step (8) where a determination is made of whether the number of set copies is complete.

When it is determined in step (2) that the layout mode is the automatic layout mode or when it is determined in step (3) that RDF 180 cannot read starting with the first document page, the sequence goes to step (11). The document page images are read in step (11), and the sequence goes to step (12) where the document page images are stored in the image memory block 304. The sequence goes to step (13) where it is determined whether the reading of all document page images is complete. When the reading of all document page images is not yet complete, the sequence returns to step (11) where the reading of document page images is continued.

Figure 14A:
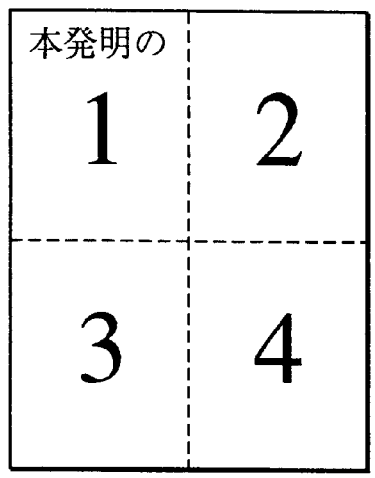
FIGS. 14A–14D illustrate one example of a layout in accordance with the orientation of an image.
Figure 14B:
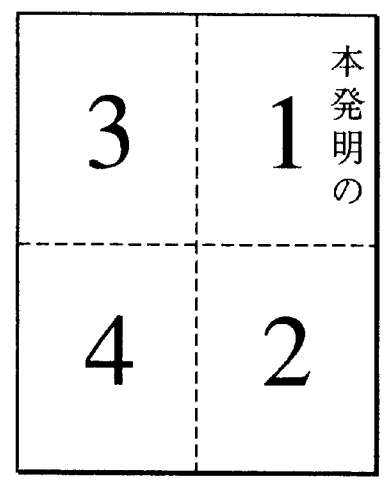
Figure 14C:
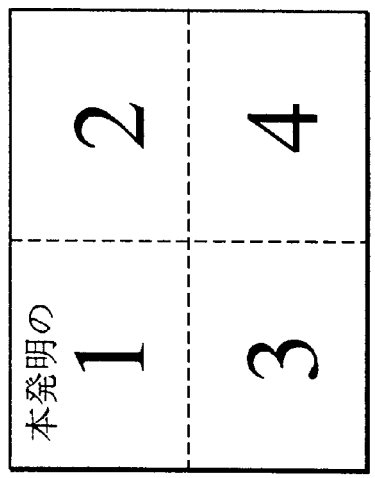
Figure 14D:
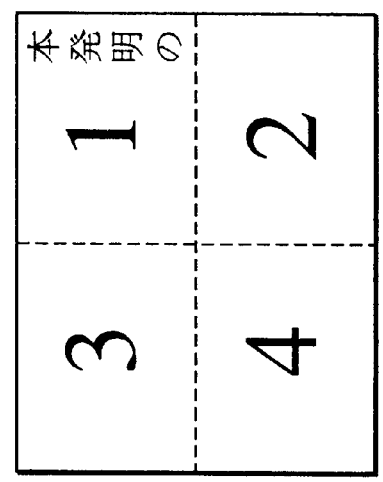

When it is determined in step (13) that the reading is complete, the sequence goes to step (14). The images are read from the image memory block 304, and are laid out in the image memory 501 in the control block 303. In this case, the order of layout (arrangement) is controlled by the determination results given by the image orientation determination block 307. FIGS. 14A–14D show examples of layout in the 4 in 1 layout. As shown, a text of vertically aligned characters arranged along a horizontal line in a portrait format is laid out as shown in page 1 of the 4 contracted pages forming as shown in FIG. 14A. A text of vertically aligned characters arranged along a vertical line in a portrait format is laid out in page 1 of the 4 contracted pages as shown in FIG. 14B. A text of horizontally aligned characters arranged along a vertical line in a landscape format is laid out in page 1 of the 4 contracted pages as shown in FIG. 14C. A text of horizontally aligned characters arranged along a horizontal line in a landscape format is laid out in page 1 of the 4 contracted pages as shown in FIG. 14D.

When the N-page document images are laid out in the image memory 501, the sequence goes to step (15) where the layout images are output to the printer module 204. The sequence then goes to step (16) where it is determined whether the outputting of the images covers the full document page count. When the full document pages are not yet output, the sequence returns to step (14) where relevant steps are repeated until the full document pages are output.

When it is determined in step (16) that the outputting of the document page images covers the full document page count, the sequence goes to step (17). It is determined in step (17) whether the number of copies set in the operation block 700 is complete. When it is determined that the number of set copies is not complete, the sequence returns to step (14) and steps (14)–(16) are repeated until the number of set copies are complete.

When it is determined in step (17) that the number of set copies is complete, the sequence ends.

When the number of document pages is not a multiple of N, the output for the copy sheet bearing the final document page includes a blank area in succession to the final document page.

In this flow diagram, when the document page images are automatically laid out by determining the orientation of the document images, the reading of all document pages is complete before outputting the images to the printer module 204. RDF 180 reads the N-page documents starting with the first document page. In this case, each image may be read from the image memory 501 and is output to the printer module 204 each time the determination of orientation of the document page image is complete.

As shown in the flow diagrams in FIGS. 6, 7 and 13, CPU 206 executes control programs stored in a memory resource such as ROM 207 or the like. The image processing apparatus efficiently image-processes by switchably meeting the requirement for flexibly complying with the need for layout modification after document image reading and the requirement for quickly obtaining the layout output of the image of the document page.

The storage medium holding a program code of software for carrying out the functions of the embodiments is loaded in the image processing system or apparatus. The computer (CPU or MPU) of the system or apparatus reads the program code stored in the storage medium to execute the program. The objects of the present invention are thus achieved.

The program code read from the storage medium performs the novel functions of the present invention, and the storage medium storing the program code constitutes the present invention.

Available as storage media for feeding the program code are floppy disk, hard disk, optical disk, magneto-optic disk, CD-ROM, CD-R, magnetic tape, non-volatile memory card, ROM, EEPROM and the like.

By executing the program code read by the computer, the functions of the embodiments are performed. Furthermore, the OS running on the computer partly or entirely performs an actual process according to the instruction of the program code, and the functions of the embodiments are thus performed.

The program code read from the storage medium is written on a function expansion board inserted into the computer or a memory provided on a function expansion unit. The CPU on the expansion board or unit partly or entirely performs the process. The functions of the embodiments are thus performed.

The present invention may be implemented into a single apparatus or into a system that is constructed of a plurality of apparatuses. The present invention may be implemented by loading a program onto an apparatus or system. In this case, the apparatus or system is set to offer the advantages of the present invention by allowing itself to read a storage medium holding a software program to carry out the method of the present invention.

A software program to carry out the method of the present invention may be downloaded through a communications program from a database on a network, into the apparatus or system of the present invention. Thus, the system or apparatus may be used as intended.

What is claimed is:

1. An image processing apparatus comprising:
    input means for inputting a plurality of pages of image data;
    storing means for storing the input image data in a memory in a layout form wherein a plurality of the input image data are laid out for a single sheet in a first mode, and storing the input image data without the layout form in a second mode;
    reading means for reading image data from said memory without layout processing in said first mode, and with layout processing in said second mode; and
    selecting means for automatically selecting said first layout mode or said second layout mode, based on a status of image processing.

2. An image processing apparatus according to claim 1 comprising:
    document feeder means for sequentially feeding a plurality of document pages of different size to a reading position; and
    image reading means for reading each document page fed by said document feeder means.

3. An image processing apparatus according to claim 2 comprising document page pre-count mode setting means for setting a document page pre-count mode for counting the number of document pages fed by said document feeder means,
    wherein said selecting means determines a setting of the document page pre-count mode in said document page pre-count mode setting means to select between the first layout mode and the second layout mode.

4. An image processing apparatus according to claim 3 wherein said selecting means selects the first layout mode when it is determined that the document page pre-count mode is set by said document page pre-count mode setting means.

5. An image processing apparatus according to claim 3, wherein said selecting means selects the second layout mode when it determines that the document page pre-count mode is not set by said document page pre-count mode setting means.

6. An image processing apparatus according to claim 2, comprising determining means for determining whether document feeding can start with a front document pare of a document stack placed on said document feeder means, wherein said selecting means selects between the first layout mode and the second layout mode, based on a determination made by said determining means.

7. An image processing apparatus according to claim 6, wherein said selecting means selects the first layout mode when said determining means determines that document feeding can start with the front document page of the document stack placed on said document feeder means.

8. An image processing apparatus according to claim 6, wherein said selecting means selects the second layout mode when said determining means determines that document feeding cannot start with the front document page of the document stack placed on said document feeder means.

9. An image processing method according to claim 1, wherein said selecting means selects the first layout mode in an automatic layout setting and selects the second layout mode in a manual layout setting.

10. A layout processing method of an image processing apparatus, said method comprising:

inputting a plurality of pages of image data;

storing the input image data in a memory in a layout form wherein a plurality of the input image data are laid out for a single sheet in a first mode, and storing the input image data without the layout form in a second mode;

reading image data from said memory without layout processing in said first mode, and with layout processing in said second mode; and automatically selecting said first layout mode or said second layout mode, based on a status of image processing.

11. An image processing method according to claim 10, further comprising:

sequentially feeding a plurality of document pages of different size to a reading position; and reading each document page fed in said feeding step.

12. An image processing method according to claim 11 further setting a document page pre-count mode for counting the number of document pages fed in said feeding step, wherein said selecting step includes determining a setting of the document page pre-count mode in said setting to select between the first layout mode and the second layout mode.

13. An image processing method according to claim 12 wherein said selecting step includes selecting the first layout mode when it is determined that the document page pre-count mode is set in said setting step.

14. An image processing method according to claim 12, wherein said selecting step includes selecting the second layout mode when it is determined that the document page pre-count mode is not set in said setting step.

15. An image processing method according to claim 11, comprising determining whether document feeding can start with a front document page of a document stack placed on a document feeder means, wherein said selecting step includes selecting between the first layout mode and the second layout mode, based on a determination made in said determining step.

16. An image processing method according to claim 15, wherein said selecting step includes selecting the first layout mode when it is determined in said determining step that document feeding can start with the front document page of the document stack placed on the document feeder means.

17. An image processing method according to claim 15, wherein said selecting step includes selecting the second layout mode when it is determined in said determining step that document feeding cannot start with the front document page of the document stack placed on the document feeder means.

18. An image processing method according to claim 10, wherein said selecting step includes selecting the first layout mode in an automatic layout setting and selecting the second layout mode in a manual layout setting.

* * * * *

UNITED STATES PATENT AND TRADEMARK OFFICE
CERTIFICATE OF CORRECTION

PATENT NO.  : 6,285,460 B1
DATED       : September 4, 2001
INVENTOR(S) : Shokyo Koh et al.

It is certified that error appears in the above-identified patent and that said Letters Patent is hereby corrected as shown below:

Title page,
Item [30], Foreign Application Priority Data, "8-257848" should read -- 8-275848 --.

Column 2,
Line 41, "FIG." should read -- FIGS. --.

Column 5,
Line 56, "Performed" should read -- performed --.

Column 7,
Line 12, "FIG." should read -- FIGS. --;
Line 26, "an" should be deleted;
Line 35, "is" should read -- are --;

Column 8,
Line 18, "slice of a rectangle for one" should be deleted;
Lines 19-44, should be deleted; and
Line 45, "text" should be deleted.

Column 16,
Line 22, "1" should read -- 1, --;
Line 29, "2" should read -- 2, --;
Line 39, "3" should read -- 3, --; and
Line 51, "pare" should read -- page --.

Column 17,
Line 16, "An image" should read -- A layout --;
Line 22, "An image" should read -- A layout -- and "11" should read -- 11, --; and
Line 29, "An image" should read -- A layout -- and "12" should read -- 12, --.

UNITED STATES PATENT AND TRADEMARK OFFICE
CERTIFICATE OF CORRECTION

PATENT NO. : 6,285,460 B1
DATED : September 4, 2001
INVENTOR(S) : Shokyo Koh et al.

It is certified that error appears in the above-identified patent and that said Letters Patent is hereby corrected as shown below:

Column 18,
Line 3, "An image" should read -- A layout --;
Line 7, "An image" should read -- A layout --;
Line 14, "An image" should read -- A layout --;
Line 19, "An image" should read -- A layout --; and
Line 25, "An image" should read -- A layout --.

Signed and Sealed this

Sixth Day of August, 2002

Attest:

JAMES E. ROGAN
Attesting Officer                Director of the United States Patent and Trademark Office